United States Patent [19]

McGimpsey

[11] Patent Number: 4,695,219

[45] Date of Patent: Sep. 22, 1987

[54] CAGE DECK

[75] Inventor: Samuel B. McGimpsey, Klerksdorp, South Africa

[73] Assignee: Vaal Reefs Mining and Exploration Co., Ltd., South Africa

[21] Appl. No.: 790,324

[22] Filed: Oct. 23, 1985

[30] Foreign Application Priority Data

Oct. 24, 1984 [ZA] South Africa ........................ 848283

[51] Int. Cl.$^4$ ............................................. B65G 65/00

[52] U.S. Cl. .................................. 414/787; 104/135; 193/35 R; 198/860.5; 414/659

[58] Field of Search ............... 414/340, 345, 347, 495, 414/507, 529, 531, 659, 912, 787; 198/860.5, 836, 860.2, 860.3; 104/135; 193/35 R, 35 C, 35 SS, 35 TE, 35 SG; 298/24

[56] References Cited

U.S. PATENT DOCUMENTS 3,370,727 2/1968 Shaw .................................. 414/495
3,704,799 12/1972 Morris, Jr. ...................... 414/495 X
4,259,907 4/1981 Schuck ........................... 104/135 X
4,557,400 12/1985 Clarke ............................. 295/24 X

FOREIGN PATENT DOCUMENTS 0103999 8/1983 European Pat. Off. .
1148051 5/1963 Fed. Rep. of Germany .
2501536 1/1975 Fed. Rep. of Germany .
221219 11/1924 United Kingdom .
503682 4/1939 United Kingdom .
840481 7/1960 United Kingdom .
876645 9/1961 United Kingdom .
954249 4/1964 United Kingdom .
2094743 9/1982 United Kingdom .
2119747 11/1983 United Kingdom .

*Primary Examiner*—Joseph E. Valenza
*Assistant Examiner*—David A. Bucci
*Attorney, Agent, or Firm*—McGlew and Tuttle

[57] ABSTRACT

A materials handling system which includes a deck on which is mounted a number of rollers, a motor for rotating the rollers in either sense, a pair of rails for a tracked vehicle, and at least one cover which is pivotal to expose or overlie the rollers.

7 Claims, 2 Drawing Figures

CAGE DECK

BACKGROUND OF THE INVENTION

This invention relates generally to a materials handling system and more particularly to a cage and a cage deck for use in such a system.

On the mines use is made of cages for moving men and equipment between surface and underground levels. A number of cage types exist:their characteristics being determined largely by the express purpose for which they are designed. For example a cage designed for tracked vehicles does not readily serve as a conveyance for men, and vice versa. This incompatibility between different modes of usage leads to inefficiencies in the transporting of personnel and in the handling of material.

Prior art known to the applicant includes the disclosures in the specifications of the following patents: UK Pat. Nos. 840481, 876645 and 221219, and German Pat. Nos. 2501536 and 1148051.

SUMMARY OF THE INVENTION

It is an object of the present invention to provide a deck for use in a materials handling system which minimizes the aforementioned problem.

The invention provides a deck for use in a materials handling system which includes means for handling a load at least of a first kind, and at least one cover which is locatable over at least part of the load handling means to provide a load-bearing platform.

The platform is intended primarily for personnel but, clearly, other types of loads can be carried by the platform.

The deck may include means for handling loads at least of two kinds.

The load handling means may include rails for tracked vehicles. Alternatively or additionally the load handling means may include rollers or similar devices for handling, pallets, containers, unit loads and the like.

The rollers may be positioned between the rails. The upper surfaces of the rollers may be flush with, or slightly higher than, the upper surfaces of the rails.

Means may be provided for rotating the rollers. The rollers may be rotatable in clockwise or anticlockwise directions. The means may include a motor of a suitable kind and drive means. The motor may be driven by any suitable energy source e.g. by means of compressed air, hydraulic fluid, electricity or the like. The motor may include a drive shaft which is coupled to the drive means. The drive means may include a gearbox, which may be reversible. Alternatively the motor is reversible. The drive means may further include cogs and chain drives.

A plurality of covers may be provided for forming platforms. The covers may be pivotally secured to suitable supports. The covers may be provided in pairs which are pivotal in opposite directions, or senses, to form the platform or to expose the underlying material handling means.

The invention further extends to a materials handling system which includes at least one deck of the kind described. The materials handling system may include two or three decks arranged one above the other at suitable locations.

The materials handling system may include a cage, for example of the kind used on the mines, a lift or elevator which may for example be adapted for use on construction sites for high rise buildings or the like, or a vehicle such as a truck, which has one or more decks of the kind described installed on it, or be installed in a warehouse or the like.

BRIEF DESCRIPTION OF THE DRAWINGS

The invention is further described by way of example with reference to the accompanying drawings in which.

DESCRIPTION OF PREFERRED EMBODIMENT

Figure 1:
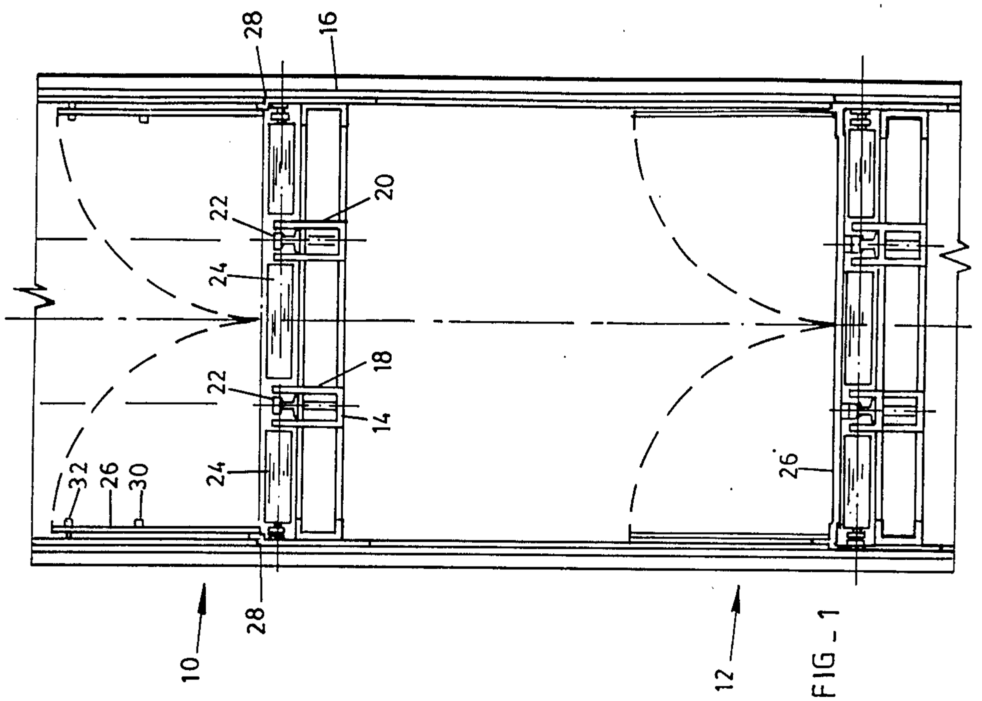
FIG. 1 is a view in elevation of portion of a cage including decks according to the invention.

FIG. 1 illustrates portion of a cage according to the invention with two decks designated 10 and 12 respectively. A cage of this kind may include three or more decks. Clearly however the principles of the invention are equally applicable to a cage with a single deck only.

The decks 10 and 12 are built on underlying supports 14 which are secured to the cage structure 16. The supports 14 include, in each case, two longitudinally extending beams 18 and 20 respectively on the tops of which are mounted rails 22.

Between the supports 18 and 20, and between these supports and the cage structure 16, are mounted rollers 24. The tops of the rollers are slightly higher than the tops of the rails 22.

On the sides of the cage, opposing each other, are pairs of covers or doors 26. The doors are hingedly attached to the cage structure 16 at hinge points 28. The doors include projections 30, on their undersides, which when the doors are moved downwardly to a horizontal position rest on the upper surfaces of the rails 22.

In FIG. 1 the upper deck 10 shows the doors or covers 26 in an elevated position at which they are retained vertically by means of catches 32. The lower deck shows the doors in a horizontal position with the projections 30 resting on the upper surfaces of the rails 22. It can be seen that the various components are so dimensioned that the rollers 24 also engage with the underside of the covers and support them.

Figure 2:
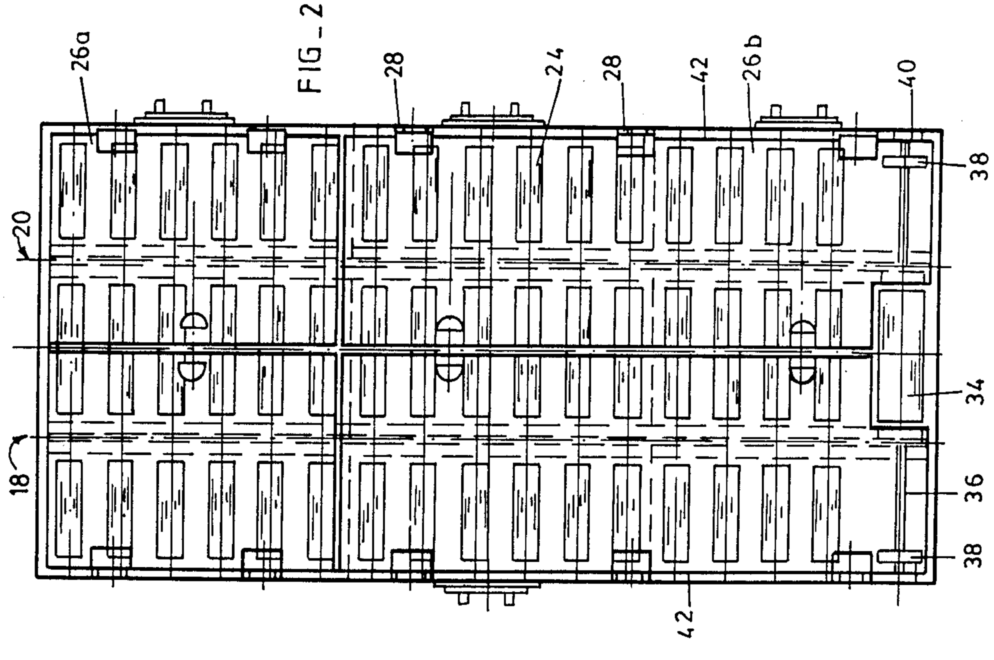
FIG. 2 is a plan view of one of the decks of the cage shown in FIG. 1.

Referring particularly to FIG. 2 it can be seen that each deck includes a drive motor 34 which, in this example, is air driven. The drive motor has, integral with it, a gearbox with an output drive shaft 36. The drive shaft is mounting in bearings 38. The drive shaft, at each of its opposed ends, terminates in drive cogs 40, and chains 42, which are engaged with the cogs 40, are engaged with cogs on the various rollers 24 adjacent the sides of the cage.

It is apparent that the cage of the invention lends itself to operating in three modes. In the first instance, with the covers 26 in the vertical position shown in connection with the deck 10, the rails 22 are exposed and a tracked vehicle can readily be loaded on to the deck, or be unloaded when necessary. Alternatively, or depending on the size of the tracked vehicle, additionally, palletized or containerized goods or unit loads can be loaded on to the decks. The motor 34 is connected to an air source by means of a quick action coupling and rotated in the appropriate sense so that via the drive system the rollers 24 are rotated. In this way a pallet or container or unit load is readily moved on to the deck. Thus, depending on the size of the equipment to be loaded, it is possible to load a container at the rear of the deck and then to load a relatively small tracked vehicle next to it.

It is also possible to lower the covers so that a platform is provided for personnel. When the covers are lowered they take up the position illustrated in connection with the deck 12 in FIG. 1 and in this way a smooth substantially conventional platform is provided for the personnel.

As is shown in FIG. 2 the covers 26 are provided in two pairs:a first relatively small area pair 26*a* and a pair 26*b* of larger area. Thus depending on the relationship of the quantity of material to be loaded and the number of personnel to be conveyed an appropriate number of covers can be lowered or raised as the case may be to provide the optimum ratio of loading area for personnel and material.

The principles of the invention have been described with particular reference to a mine cage. Clearly they can also be used in conjunction with a lift or elevator or, more generally, with a materials handling system of any suitable kind. For example a lift or elevator can be adapted for use with a high rise building, on a construction site, by including one or more decks of the kind described. It is also possible to equip a truck, for rail or road use, with one or more decks of the kind described. The decks can also be included in a "stationary" materials handling system for example in a warehouse where material of different kinds, or personnel, move at different times along a common route.

I claim:

1. A deck for a cage in a materials handling system which includes a pair of rails for a tracked vehicle, the rails extending in a first direction, a plurality of rollers located between and outside the rails, the upper surface of the rollers being at least as high as the upper surfaces of the rails, the rollers being rotatable about axes which are transverse to the first direction, drive means for rotating at least some of the rollers in a selected sense of rotation, and at least one cover which is pivotally mounted and which is movable between an upright position at which the rails, and the rollers, are exposed, and a horizontal position in which it forms a load-bearing platform which overlies at least some of the rollers.

2. A deck according to claim 1 wherein: the drive means includes a motor, a plurality of cogs connected respectively to the plurality of rollers, and a chain which is connected to the cogs and to the motor and which imparts rotational movement to the rollers.

3. A deck according to claim 1, wherein: the covers are provided in a plurality of pairs which are pivotal in opposite directions.

4. A cage which includes two or more decks, each deck being according to claim 1, the decks being located spaced apart, and one above the other within the cage.

5. A deck for use with a cage structure comprising:

underlying support adapted to be secured to the cage;

a plurality of rails fixedly mounted with respect to said underlying support and extending in a first direction, said rails being adapted for supporting a track vehicle;

a plurality of rollers located between and outside said rails, the upper surface of said rollers being at least as high as the upper surface of said rails, said rollers being rotatable about axes which are transverse to said first direction;

drive means for rotating at least some of said rollers in a selected rotational direction; and, at least one cover which is pivotally mounted and which is movable between an upright position, at which the rails and the rollers are exposed, and a horizontal position in which it forms a load-bearing platform which overlies at least some of the rollers.

6. A structure for a materials handling system comprising: a cage structure having support walls extending in a vertical direction; and, at least one deck structure positionable between said support walls and adapted to be fixed at a location along said support walls so as to extend in a direction transverse to the direction of said support walls, said at least one deck structure including: an underlying support, adapted to be secured to said cage walls; a plurality of rails fixedly mounted with respect to said underlying support and extending in a first direction, said rails being adapted for supporting a tracked vehicle; a plurality of rollers located between and outside said rails, the upper surface of said rollers being at least as high as the upper surface of said rails, said rollers being rotatable about axes which are transverse to the first direction; drive means for rotating at least some of the rollers in a selected rotational direction; and, at least one cover which is pivotally mounted and which is movable between an upright position at which the rails, and the rollers, are exposed, and a horizontal position in which it forms a load-bearing platform which overlies at least some of the rollers.

7. A structure according to claim 6, including: two or more decks, each of said decks being positioned at a location spaced apart from one of said other decks, and also positioned one above the other, within said cage walls.

* * * * *